UNITED STATES PATENT OFFICE.

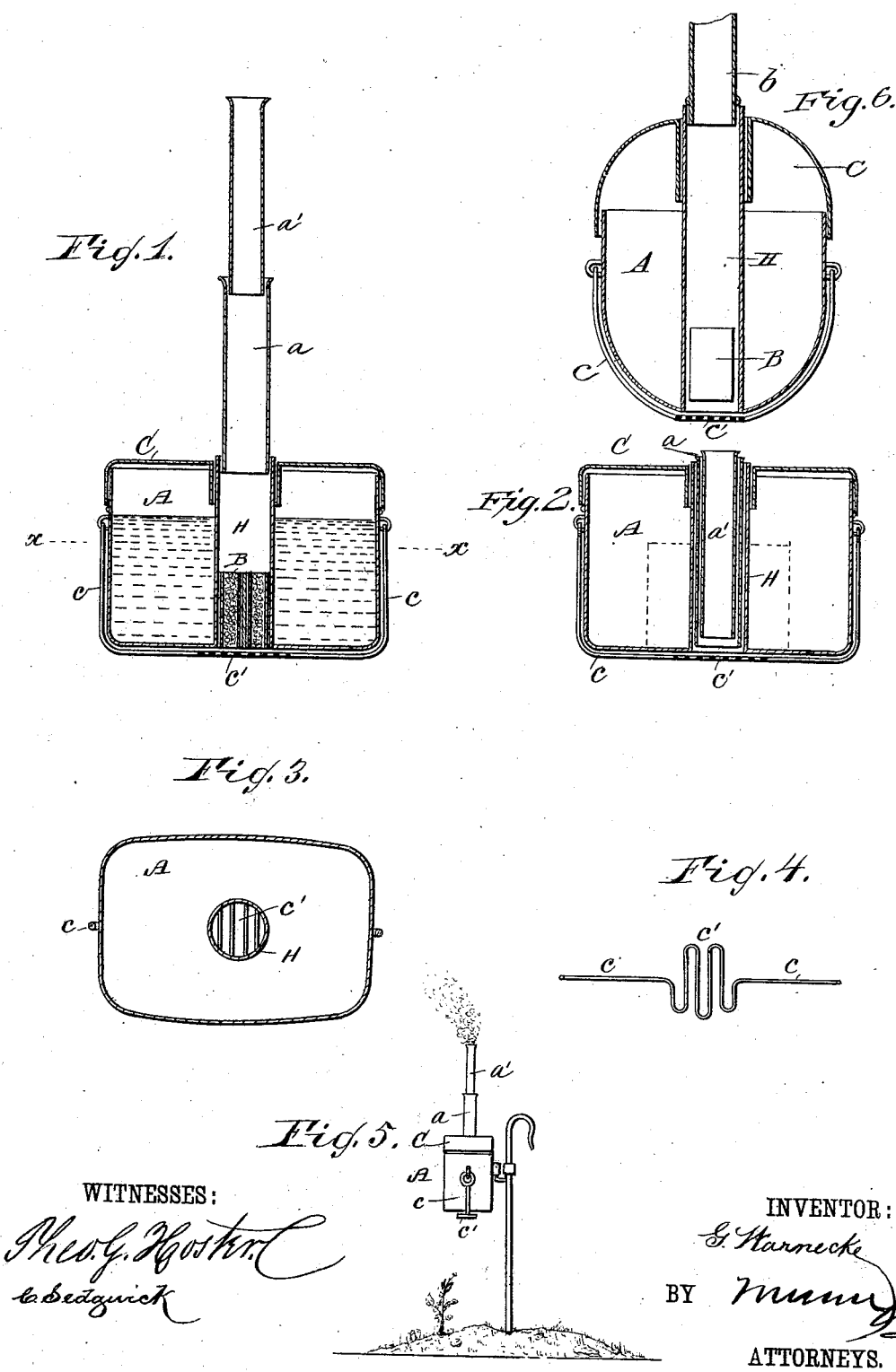

GUSTAV WARNECKE, OF FRANKFORT-ON-THE-MAIN, GERMANY, ASSIGNOR OF ONE-HALF TO ALFRED VON NEUFVILLE, OF SAME PLACE.

PORTABLE COOKING APPARATUS.

SPECIFICATION forming part of Letters Patent No. 367,170, dated July 26, 1887.

Application filed May 21, 1886. Serial No. 202,866. (No model.)

*To all whom it may concern:*

Be it known that I, GUSTAV WARNECKE, of Frankfort-on-the-Main, Germany, have invented a new and Improved Portable Cooking Apparatus, of which the following is a full, clear, and exact description.

The invention consists of various parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1 is a central vertical section of my improvement ready for use. Fig. 2 is a central vertical section of the same with the smoke-stack telescoped. Fig. 3 is a sectional plan view of the same on the line $x\ x$, Fig. 1. Fig. 4 is a plan view of the same. Fig. 5 is a side elevation of my improvement attached to a post. Fig. 6 represents a modified form of my improvement.

The vessel A, of suitable size and form, is provided with the central tube, H, open at the top and bottom, and with the cover or lid C, which fits over the upper ends of the sides of the vessel A, and also surrounds the upper end of the central tube, H. The tube $a$ telescopes into the tube H, and a similar tube, $a'$, into the said tube $a$, the tubes $a$ and $a'$ forming the chimney of the apparatus. To two opposite sides of the vessel A is hung the bent bail $c$, which is formed into a grate, $c'$, placed directly under the bottom opening of the central tube, H. The bail $c$, with its grate $c'$, can be swung from under the bottom of the vessel A, so as to permit of inserting into the central tube, H, the package B, which contains a prepared fuel, which is preferably constructed as shown and described in a separate application, filed April 28, 1887, and forming no part of the present application. The vessel is also provided with a hook or an eye, by which the apparatus can be attached to a post, as shown in Fig. 5, or to a belt worn by the user.

In order to place the substance to be cooked in the vessel A, the lid or cover C is removed and then replaced after the substance has been placed in the vessel. The wick $d$ of the fuel-package B is then ignited, which causes the instantaneous ignition of the entire package of prepared fuel. The smoke is drawn off by the extended chimney formed of the tubes $a$ and $a'$, and the part $c'$ of the bail $c$, or the wire-netting $i$, as the case may be, acts as a grate in the usual manner.

It will be seen that the intensity of the combustion in the central heating-tube, H, is increased as a free circulation of air is established through the central tube, H, and the extended chimney. As the combustion takes place within the vessel A containing the substance to be cooked, the heat emanating from the said combustion is fully utilized.

The apparatus may be made reversible, as shown in Fig. 6, so that the lower larger portion may be used for cooking soup and the like, and when reversed the upper smaller or cover part may be used for making coffee, tea, &c. The grate $c'$ of the bail $c$ can be swung around to form a grate for the cover C, when the vessel is reversed, and the tube $b$, forming the chimney, may be withdrawn and inserted in the central tube at the other end. The advantage of this construction is that coffee or soup, for instance, can be boiled in separate parts of the same apparatus, so that the flavor of neither the coffee nor the soup is affected.

The heating space is sometimes enlarged so that it can serve as a magazine for carrying a quantity of fuel. The central tube, H, can also be used for other purposes. When one or more separate tubes are used for the chimney, as shown at $b$ in Fig. 6, they can be placed in the vessel A during transportation.

It will be seen that the cooking apparatus can also be used in the ordinary manner upon a stove or over an open fire, which would render the above-mentioned fuel-package superfluous.

Having thus fully described my invention, I claim as new and desire to secure by Letters Patent—

The combination, with cooking-vessels formed with a central tube serving as a fire-chamber, of the bail bent at its middle to form a grate for the fire-chamber, substantially as set forth.

In testimony whereof I have signed my name to this specification in the presence of two subscribing witnesses.

GUSTAV WARNECKE.

Witnesses:
JOSEPH PATRICK,
JACOB MUELLER.